United States Patent
Schrauwen

(10) Patent No.: US 9,738,835 B2
(45) Date of Patent: Aug. 22, 2017

(54) PROCESS FOR PERFORMING A FISCHER TROPSCH REACTION

(71) Applicant: SHELL OIL COMPANY, Houston, TX (US)

(72) Inventor: Franciscus Johannes Maria Schrauwen, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 14/837,887

(22) Filed: Aug. 27, 2015

(65) Prior Publication Data

US 2015/0368565 A1 Dec. 24, 2015

Related U.S. Application Data

(62) Division of application No. 12/969,223, filed on Dec. 15, 2010, now Pat. No. 9,149,781.

(30) Foreign Application Priority Data

Dec. 28, 2009 (EP) .................................. 09180825

(51) Int. Cl.
  *C10G 2/00* (2006.01)
  *B01J 8/06* (2006.01)

(52) U.S. Cl.
  CPC ............ *C10G 2/33* (2013.01); *B01J 8/065* (2013.01); *B01J 8/067* (2013.01); *C10G 2/34* (2013.01);

(Continued)

(58) Field of Classification Search
  CPC ..... B01J 8/06; B01J 8/065; B01J 8/067; B01J 8/025; B01J 8/0285; B01J 2208/00212;
  (Continued)

(56) References Cited

U.S. PATENT DOCUMENTS

| | | |
|---|---|---|
| 2,475,025 A | 7/1949 | Huff |
| 3,268,299 A | 8/1966 | Russel |

(Continued)

FOREIGN PATENT DOCUMENTS

| | | |
|---|---|---|
| CA | 1166655 | 5/1984 |
| DE | 102004041777 | 3/2006 |

(Continued)

OTHER PUBLICATIONS

IUPAC version of the Periodic Table of Elements such as that described in the 87th Edition of the Handbook of Chemistry and Physics (CRC Press).

(Continued)

*Primary Examiner* — Lessanework Seifu

(57) ABSTRACT

The invention relates to a process for performing a Fischer Tropsch reaction in a reactor comprising at least two reactor tubes, a coolant chamber, and a gas distribution system below the coolant chamber, whereby at least two reactor tubes extend through the coolant chamber and one or more highly porous catalysts, said catalyst(s) having a size of at least 1 mm and comprising a porous body and a catalyst material, whereby the porous body has a porosity within the range of between 50 and 98 volume %.

10 Claims, 1 Drawing Sheet

(52) U.S. Cl.
CPC ..... *C10G 2/341* (2013.01); *B01J 2208/00212* (2013.01); *Y02P 20/582* (2015.11)

(58) Field of Classification Search
CPC ...... B01J 2208/00938; B01J 2208/027; C10G 2/34; C10G 2/341; C10G 2/33
See application file for complete search history.

(56) References Cited

U.S. PATENT DOCUMENTS

| | | | |
|---|---|---|---|
| 4,409,131 | A | 10/1983 | Fetchin |
| 5,080,872 | A | 1/1992 | Jezl et al. |
| 5,502,019 | A | 3/1996 | Augustine et al. |
| 5,520,890 | A * | 5/1996 | Lorentzen ............... C07C 1/042 422/198 |
| 5,783,604 | A | 7/1998 | Garcia Nunez |
| 5,783,607 | A | 7/1998 | Chaumette et al. |
| 5,863,856 | A | 1/1999 | Mauldin |
| 6,262,131 | B1 | 7/2001 | Arcuri et al. |
| 7,067,559 | B2 | 6/2006 | Bhatt et al. |
| 7,232,848 | B2 | 6/2007 | Mohedas et al. |
| 2004/0102530 | A1 * | 5/2004 | Borsa ............... B01J 8/065 518/704 |
| 2004/0192989 | A1 | 9/2004 | Espinoza et al. |
| 2004/0235966 | A1 | 11/2004 | Bhatt et al. |
| 2007/0299148 | A1 * | 12/2007 | Verbist ............... B01J 8/067 518/712 |
| 2009/0220391 | A1 | 9/2009 | Gerlinger et al. |

FOREIGN PATENT DOCUMENTS

| | | |
|---|---|---|
| EP | 2000207 | 12/2008 |
| JP | HEI7-112125 | 5/1995 |
| JP | 2004-167448 | 6/2004 |
| JP | 2004-536696 | 12/2004 |
| JP | 2005-305381 | 11/2005 |
| JP | 2008-535802 | 9/2008 |
| WO | 0176734 | 10/2001 |
| WO | 2005075065 | 8/2005 |
| WO | 20070045574 | 4/2007 |
| WO | 20080089376 | 7/2008 |

OTHER PUBLICATIONS

Pangarkar et al., "Experimental and numerical comparison of structured packings with a randomly packed bed reactor for Fischer-Tropsch synthesis", Catalysis Today 147S (2009) S2-S9, www.elsevier.com/locate/cattod.

Philippe et al., "Effect of structure and thermal properties of a Fischer-Tropsch catalyst in a fixed bed", Catalysis Today 147S (2009) S305-S312, www.elsevier.com/locate/cattod.

* cited by examiner

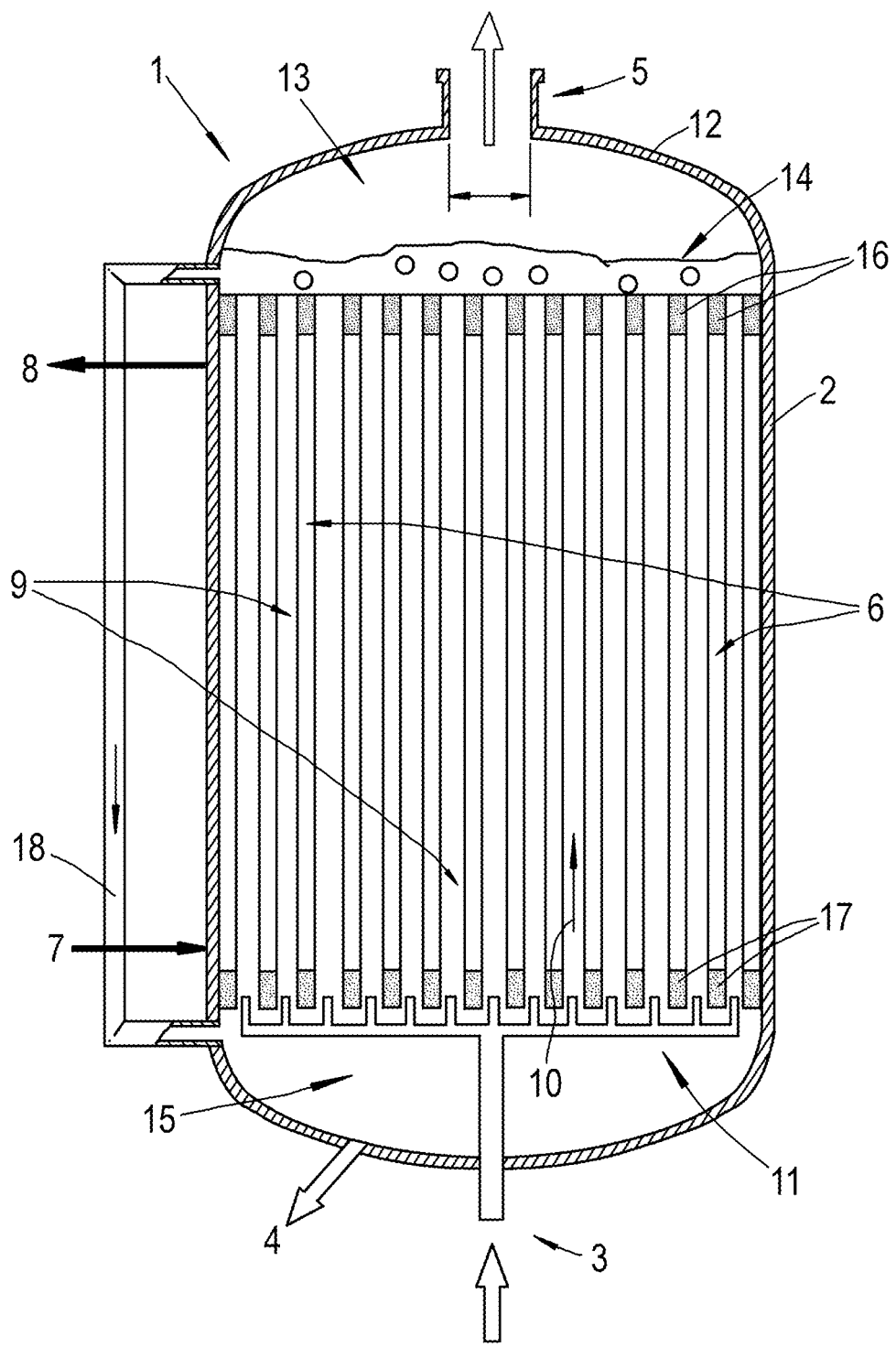

PROCESS FOR PERFORMING A FISCHER TROPSCH REACTION

This application claims the benefit of European Application No. 09180825.3 filed Dec. 28, 2009, which is incorporated herein by reference and is a divisional application of U.S. Ser. No. 12/969,223 filed Dec. 15, 2010.

BACKGROUND OF THE INVENTION

The present invention relates to a reactor for carrying out an exothermic process, such as a Fischer-Tropsch process. It especially relates to a fixed bed reactor comprising a gas distribution system in the bottom of the reactor. In a preferred embodiment the reactor comprises highly porous catalysts. The invention further relates to the use of the reactor.

As is explained in WO 2005/075065, Fischer-Tropsch processes are often used for the conversion of gaseous hydrocarbon feed stocks into liquid and/or solid hydrocarbons. The feed stock, e.g. natural gas, associated gas, coal-bed methane, residual (crude) oil fractions, coal and/or biomass is converted in a first step to a mixture of hydrogen and carbon monoxide, also known as synthesis gas or syngas. The synthesis gas is then converted in a second step over a suitable catalyst at elevated temperature and pressure into paraffinic compounds ranging from methane to high molecular weight molecules comprising up to 200 carbon atoms, or, under particular circumstances, more.

Numerous types of reactor systems have been developed for carrying out the Fischer-Tropsch reaction. Fischer-Tropsch reactor systems include fixed bed reactors, in particular multi-tubular fixed bed reactors, fluidized bed reactors, such as entrained fluidized bed reactors and fixed fluidized bed reactors, and slurry bed reactors, such as three-phase slurry bubble columns and ebullated bed reactors.

The Fischer-Tropsch reaction is highly exothermic and temperature sensitive and thus requires careful temperature control to maintain optimum operating conditions and hydrocarbon product selectivity.

Commercial Fischer Tropsch fixed-bed and three-phase slurry reactors typically utilize boiling water to remove reaction heat. In fixed-bed reactors, individual reactor tubes are located within a shell containing water/steam typically fed to the reactor via flanges in the shell wall. The reaction heat raises the temperature of the catalyst bed within each tube. This thermal energy is transferred to the tube wall forcing the surrounding water to boil. In the slurry design, cooling tubes are placed within the slurry volume and heat is transferred from the liquid continuous matrix to the tube walls. The production of steam within the tubes provides cooling.

SUMMARY OF THE INVENTION

The present invention provides an improved reactor for carrying out an exothermic process, such as a Fischer-Tropsch process.

The present invention concerns a reactor (1) for carrying out an exothermic process, comprising a reactor shell (2), inlets (3, 7) for introducing reactants and coolant into the reactor shell (2), outlets (4, 8) for removing product and coolant from the reactor shell (2), at least two reactor tubes (9), a coolant chamber (6), and a gas distribution system (11) below the coolant chamber (6), whereby at least two reactor tubes (9) extend through the coolant chamber (6) to enable fluid communication between the space (15) below the coolant chamber (6) and the space (13) above the coolant chamber (6), said reactor (1) comprising one or more highly porous catalysts. The catalyst(s) have a size of at least 1 mm. The catalyst(s) comprise(s) a porous body and a catalyst material. The porous body has a porosity within the range of between 50 and 98 volume %.

BRIEF DESCRIPTION OF THE DRAWING

FIG. 1 is a vertical cross-section of a reactor according to the present invention; the catalyst in the reactor tubes is not shown.

DETAILED DESCRIPTION OF THE INVENTION

Catalysts having a size of at least 1 mm are defined as catalysts having a longest internal straight length of at least 1 mm. Preferably, the highly porous catalyst has pores with a size of more than 10 µm. The catalyst material comprises a carrier and a catalytically active component or precursor therefor. A precursor of a catalytically active component can be made catalytically active by subjecting it to hydrogen or a hydrogen containing gas.

A reactor according to the present invention has several advantages. One advantage of a reactor according to the present invention is that it is possible to have a very good heat transfer between the catalyst and the cooling medium in the coolant chamber as compared to the heat transfer between the catalyst and the cooling medium in a fixed bed reactor comprising a packing of solid catalyst particles. The heat transfer in a reactor according to the present invention is also better as compared to a multi-tubular fixed bed reactor comprising a highly porous catalyst in the reactor tubes, wherein the reactant gases flow from the top of the reactor tubes downwards through the reactor tubes.

Good heat transfer allows using larger tube diameters, and thus less tubes per reactor volume. This makes the reactor simpler to build and to operate.

Another advantage of a reactor according to the present invention is that a low pressure drop along the reactor tube can be obtained as compared to a fixed bed reactor comprising a packing of solid catalyst particles. A low pressure drop reduces the costs and the energy consumption of feed gas and/or recycle gas compressor(s).

A further advantage of a reactor according to the present invention is that up-scaling can be performed more easily and more reliably as compared to slurry reactors comprising fluidized catalyst particles. This is because the design of a commercial reactor can rely on small scale testing of a single tube. Up-scaling can simply and reliably be performed by multiplication of the number of reactor tubes. Another advantage of a reactor according to the present invention is that a uniform distribution of catalyst within the reactor can be obtained, independent of hydrodynamic operating conditions. Even stacking of different catalyst structures within a single reactor tube can be applied. This is a big advantage over slurry reactors comprising a vessel or shell with a plurality of coolant tubes. Preferably a highly porous catalyst as described below, or a stacking or gradient of different highly porous catalysts as described below, is applied.

A further advantage of a reactor according to the present invention is that the product can be easily separated from the catalyst. This is a big advantage over slurry reactors comprising fluidized catalyst particles.

The coolant chamber (6) preferably comprises at least two substantially parallel plates (16, 17) which separate the coolant chamber (6) from the space (15) below the coolant chamber (6) and the space (13) above the coolant chamber (6). Such substantially parallel plates (16, 17) preferably are substantially horizontal. Preferably at least two reactor tubes (9) that extend through the coolant chamber (6) also extend through the at least substantially parallel plates (16, 17) of the coolant chamber (6).

The reactor preferably comprises less than 50000 reactor tubes, more preferably less than 30000, even more preferably less than 10000, most preferably less than 5000. The reactor preferably comprises at least 10 reactor tubes, more preferably at least 100, even more preferably at least 1000, most preferably at least 2000.

The reactor tubes preferably have a length of more than 1 meter, more preferably more than 5 meters, even more preferably more than 7 meters. The reactor tubes preferably have a length of less than 70 meters, more preferably less than 40 meters, even more preferably less than 20 meters.

The reactor tubes preferably have an inner diameter of at least 1 cm, more preferably at least 2 cm, even more preferably at least 5 cm. The reactor tubes preferably have an inner diameter of less than 30 cm, more preferably less than 20 cm, even more preferably less than 15 cm.

Preferably at least 70%, more preferably at least 80% of each reactor tube is in the coolant chamber.

The inlet(s) for introducing coolant into the reactor shell and the outlet(s) for removing coolant from the reactor shell are preferably between the parallel plates that separate the coolant chamber from the space below and the space above the coolant chamber. More preferably, one or more coolant inlets are placed just above the lowest parallel plate of the coolant chamber, and one or more coolant outlets are placed just below the highest parallel plate of the coolant chamber.

The inlet(s) for introducing reactants into the reactor shell preferably are below the coolant chamber. One or more inlets for introducing reactants may be situated through substantially vertical reactor shell below the coolant chamber and/or may be situated through the dome at the bottom of the reactor. An inlet for introducing reactants preferably comprises a nozzle.

The reactant gas is preferably distributed and supplied to individual reactor tubes. The gas distribution system 11 preferably passes gas from the inlet 3 to reactor tubes 9 via distribution system outlets that are placed in and/or underneath the reactor tubes. The reactant gas, for example syngas, flows upwards through the catalysts in the reactor tubes and is converted into products. Generally not all syngas that passes through a catalyst is converted into products.

In one embodiment, the gas distribution system comprises a substantially horizontal piping that is installed below the tubes, e.g. in rows. The pipes have several reactant gas outlets. The pipes may, for example, be perforated. Additionally or alternatively, the pipes may, for example, have small pipes in a vertical direction that guides the gas into the individual tubes. In a preferred embodiment the small pipes extend into the lower part of the tubes.

In order to have a minimal number of reactant gas inlets through the reactor shell, one embodiment comprises a gas distribution system with rows of pipes comprising reactant gas outlets, and whereby the rows of pipes are connected to larger distribution piping. The larger distribution piping may, for example, be in the form of a ring.

In a preferred embodiment, the gas distribution system is designed such that every reactor tube that is supplied with reactant gas receives a similar amount of reactant gas. This assures even conversion throughout the reactor. This also contributes to a good heat transfer both by even conversion and by even liquid movement in the reactor.

The outlet(s) for removing product may be above and/or below the coolant chamber. The outlet(s) for removing product may additionally or alternatively be at the level of the coolant chamber. An outlet above the coolant chamber may, for example, comprise an overflow weir. Liquid draw-off through an outlet below the coolant chamber may, for example, be based on level control. In case of level control, the level of liquid product in the reactor provides a set-point for draw-off via a flow controller. Preferably the reactor comprises an outlet below the coolant chamber. When product is removed below the coolant chamber no or almost no gas will be dragged with the liquid product. Product removed below the coolant chamber will thus probably contain less gaseous products, e.g. $H_2O$, $C_4$-products, $CO_2$, CO and $H_2$, as compared to product removed above the coolant chamber. An outlet below the coolant chamber also provides the possibility to empty the reactor Most preferably the discharge of product is on basis of level control. For example, a level control with a range of several meters may be placed above the coolant chamber to regulate a valve in an outlet for removing product below the coolant chamber. In that case liquid product is discharged via the outlet below the coolant chamber on basis of the level control above the coolant chamber.

In a preferred embodiment, during use of the reactor according to the invention, the amount of liquid in the reactor is sufficiently large to have the catalyst in the reactor tubes immersed in liquid, even when no reactant gas is flowing into the reactor. This may be adjusted by means of level control.

During use of the reactor according to the invention, there is gas upflow, or co-current upflow of gas and liquid.

In a preferred embodiment, the reactor comprises reactor tubes as well as one or more liquid recycle tubes. The reactor tubes contain catalyst during use of the reactor. Liquid recycle tubes are tubes which do not contain catalyst during use of the reactor. A liquid recycle tube (18) may extend through the coolant chamber (6) to enable fluid communication between the space (15) below the coolant chamber (6) and the space (13) above the coolant chamber (6). During use, liquid is transferred upwards in the reactor tubes (9) due to the reactant gas passing through the reactor tubes, and liquid is moving downwards in one or more liquid recycle tubes (18). It was found that optimal heat transfer may be achieved by using a reactor that comprises liquid recycle tubes.

The reactor may comprise liquid recycle tubes of a different size than the reactor tubes: they may have a different inner diameter and/or a different length. Alternatively, the liquid recycle tubes may have the same size as the reactor tubes. In that case, one may choose to fill most tubes with catalyst and leave some tubes empty, i.e. use most tubes as reactor tubes and some tubes as liquid recycle tubes, before using the reactor. Reactant gas is preferably not fed to a liquid recycle tube.

In case a tube which can be used as reactor tube is not filled with catalyst in order to use this tube as liquid recycle tube, reactant gas is not fed to this liquid recycle tube. In such a case it may thus be necessary to close an outlet of the gas distribution system if this is present underneath or in the tube.

In one embodiment, the reactor comprises one or more liquid recycle tubes which is/are situated outside the reactor shell. Such a liquid recycle tube passes through the reactor shell at two different locations. A liquid recycle tube (18)

situated outside the reactor shell may extend through the reactor shell (2) above and below the coolant chamber (6) to enable fluid communication between the space (13) above the coolant chamber (6) and the space (15) below the coolant chamber (6). This allows a flow of liquid down the liquid recycle tube(s) outside the reactor shell during use of the reactor.

In a preferred embodiment, the reactor comprises a top outlet 5. In that case non-reacted gas and optionally gaseous product may leave the reactor via top outlet 5. If present, one or more top outlets 5 preferably are situated above the coolant chamber, and may be situated through the substantially vertical reactor shell above the coolant chamber and/or may be situated through the dome at the top of the reactor. The top outlet preferably comprises a nozzle.

In a preferred embodiment, the reactor comprises a top outlet through the dome at the top of the reactor and a gas-liquid separator, e.g. a demister or a cyclone, in the reactor underneath the top outlet. A gas-liquid separator may be used to limit the amount of material that leaves the reactor through the top outlet, and increases the amount of material that leaves the reactor via a product outlet.

The reactor of the present invention is especially suitable for carrying out a Fischer-Tropsch process. When in use as Fischer-Tropsch reactor, a reactor according to the present invention enables fluid communication of syngas and fluid hydrocarbons between the space (15) below the coolant chamber (6) and the space (13) above the coolant chamber (6) through the at least two reactor tubes (9) that extend through the coolant chamber (6).

When used as Fischer-Tropsch reactor, the syngas is converted to hydrocarbons. The conversion products may be in the liquid phase, or partial liquid and partial gas phase under reactor operating conditions.

During normal operation, the reactor tubes are filled with liquid product and the reactant gas is bubbled through the liquid product. This way optimal heat transfer from the catalyst to the coolant chamber is obtained via the liquid product. Also good transfer of reactants to the catalyst structures may be achieved in this way. During normal operation as a Fischer Tropsch reactor, the reactor tubes are filled with liquid hydrocarbons and the syngas is bubbled through the liquid hydrocarbons. This way optimal heat transfer from the catalyst to the coolant chamber is obtained via the liquid hydrocarbons.

Coolant is preferably supplied to the coolant chamber via one or more inlets at the lower side of the coolant chamber, and preferably leaves the coolant chamber via one or more outlets at the upper side of the coolant chamber. A very suitable coolant is water and/or steam. Boiling water may be circulated through a natural circulation thermosyphon system with a steam drum. Alternatively, boiling hydrocarbons such as kerosene may be used as coolant.

A reactor according to the present invention comprises a highly porous catalyst. The catalyst has a size of at least 1 mm. Catalysts having a size of at least 1 mm are defined as catalyst having a longest internal straight length of at least 1 mm. When of sufficient size, the highly porous catalyst can be fixed in a reactor tube.

The catalyst preferably comprises a porous body and a catalyst material. The catalyst is also referred to as catalyst body. The porous body acts as support for the catalyst material. The catalyst material comprises a carrier and a catalytically active component or precursor therefor. A precursor of a catalytically active component can be made catalytically active by subjecting it to hydrogen or a hydrogen containing gas.

A catalyst, or catalyst body, is defined for this specification as a body that either is catalytically active, or that can be made catalytically active by subjecting it to hydrogen or a hydrogen containing gas. For example, metallic cobalt is catalytically active in a Fischer-Tropsch reaction. In case the catalyst, or catalyst body, comprises a cobalt compound, the cobalt compound can be converted to metallic cobalt by subjecting it to hydrogen or a hydrogen containing gas. Subjection to hydrogen or a hydrogen containing gas is sometimes referred to as reduction or activation.

When a catalyst is referred to as comprising a certain amount of catalytically active metal, reference is made to the amount of metal atoms in the catalyst which are catalytically active when in metallic form. A catalyst comprising a cobalt compound, for example, is thus considered as a catalyst having a certain amount of catalytically active cobalt atoms. A catalyst thus comprises a certain amount of catalytically active metal, regardless of its oxidation state.

The porous bodies may be of regular or irregular shapes, or a mixture thereof. Such include cylinders, cubes, spheres, ovoids, and other shaped polygons.

In a preferred embodiment the porous bodies have a form or shape selected from the group consisting of gauze, honeycomb, monolith, sponge, foam, mesh, webbing, foil construct and woven mat form, or any combination of these.

The porous bodies may be a combination of forms such as those listed above. For example, the porous bodies may be made up of honeycomb shaped material and have a circular outer shape. Another example is a cylinder made from woven mat.

The porous bodies may be made from any inert material capable of withstanding conditions within the reactor. The porous bodies may be made from refractory oxides, for example titania, silica, alumina. The porous bodies are preferably made from metals, for example stainless steel, iron or copper.

The porosity within the porous bodies, i.e. the internal voidage of the porous bodies before application of the catalyst material on the porous bodies, is within the range of between 50 and 98 volume %; preferably the internal voidage is less than 95 volume %; preferably the internal voidage is more than 60 volume %, more preferably more than 70 volume %, even more preferably more than 80 volume %, and most preferably more than 90 volume %, calculated on the circumferential volume of the porous bodies.

The porosity of the catalyst, or catalyst body, i.e. including the catalyst material and the porous body, is at least 50 volume % and is preferably at least 65 volume %, more preferably around 85 volume %, calculated on the circumferential volume of the catalyst body.

The external voidage of the catalysts, or catalyst bodies, i.e. including the catalyst material and the porous bodies, in situ in a reactor tube is in the range of between 0 and 60 volume %, calculated on the reactor tube volume outwith the circumferential volumes of the catalysts, or catalyst bodies, in the reactor tube.

In other words, a reactor tube may be completely filled with one or more porous catalysts (catalyst bodies). In that case, the external voidage in situ in the reactor tube is 0 volume %, and all reactant gas and liquid product will pass through the porous structure of the catalyst bodies. Alternatively, there may be space around the circumferential volumes of the catalyst bodies in situ in a reactor tube. In that case, the external voidage in situ in the reactor tube may be up to 60 volume %, and reactant gas and liquid product will pass through the porous structure of the catalyst bodies and around the circumferential volumes of the catalyst bodies.

For example, in the case of a donut-shaped porous catalyst body made out of metal wires covered with catalyst material, the circumferential volume will not include the inner hole of the donut shape. In the case of irregularly stacked donut-shaped catalyst bodies, reactant gas and liquid product will pass through the porous structure of the catalyst bodies and around the circumferential volumes of the catalyst bodies. When passing around the circumferential volume of a catalyst body, fluids may pass the catalyst body at all sides, including through the inner hole of the donut-shaped catalyst body.

The porosity of the catalyst bodies, in other words the open volumes within the catalyst bodies, must be sufficient to facilitate efficient through-flow of reactants, while at the same time the specific surface area of each catalyst body should be as large as possible to increase exposure of reactants to the catalyst material.

Suitable porous bodies on which the catalyst material can be applied, can be prepared in-house or obtained commercially. An example of a producer of suitable porous bodies is the Fraunhofer-Institute for Manufacturing and Advanced Materials in Dresden, Germany. The Fraunhofer-Institute advertises and sells, for example, melt extracted metallic fibres, and highly porous fibre structures that can be cylindrically or spherically shaped. Another example of a producer of suitable porous bodies is Rhodius. Rhodius advertises and sells, for example, knitted wire meshes of various shapes, with various thicknesses and with various densities. Another example of a producer of suitable porous bodies is Fibretech.

The catalyst material may be applied to the porous bodies. Preferably a thin layer of catalyst material is applied to the porous bodies.

The catalyst material layer is preferably sufficiently thin to avoid diffusional mass transport limitations (decrease of CO and/or hydrogen partial pressure and/or unfavorable change of the hydrogen/carbon monoxide-ratio within the catalyst layer) of the syngas components within the catalyst material layer. The thickness of the catalyst material layer is preferably increased up to the onset of mass transport limitation. There is no upper limit to the thickness of the catalyst material layer onto the porous bodies other than the remaining voidage after application of the catalyst material on the porous body for hydrodynamic reasons.

It is preferred that the catalyst material fraction of the catalyst bodies is at least about 1% by volume and preferably greater than about 4% by volume (with reference to the volume of the catalyst bodies), with a preferred maximum of 25% by volume.

Preferably the catalyst material is applied as a layer to the porous bodies, typically in a thickness of from about 1 to about 300 microns and preferably from about 5 to about 200 microns.

General methods of preparing catalyst or materials are known in the art, see for example U.S. Pat. Nos. 4,409,131, 5,783,607, 5,502,019, WO 0176734, CA 1166655, U.S. Pat. Nos. 5,863,856 and 5,783,604. These include preparation by co-precipitation and impregnation. Such processes could also include sudden temperature change.

The catalyst material may comprise one or more metals or metal oxides as promoters, more particularly one or more d-metals or d-metal oxides.

Preferably the catalyst is a Fischer-Tropsch catalyst. Fischer-Tropsch catalysts are known in the art, and typically include a Group 8-10 metal component, preferably cobalt, iron and/or ruthenium, more preferably cobalt.

References to "Groups" and the Periodic Table as used herein relate to the new IUPAC version of the Periodic Table of Elements such as that described in the 87$^{th}$ Edition of the Handbook of Chemistry and Physics (CRC Press).

Suitable metal oxide promoters may be selected from Groups 2-7 of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are most suitable promoters.

Suitable metal promoters may be selected from Groups 7-10 of the Periodic Table. Manganese, iron, rhenium and Group 8-10 noble metals are particularly suitable, with platinum and palladium being especially preferred.

Any promoter(s) is typically present in an amount of from 0.1 to 60 parts by weight per 100 parts by weight of a carrier. It will however be appreciated that the optimum amount of promoter(s) may vary for the respective elements which act as promoter(s).

Typically the catalyst material comprises a carrier material such as a porous inorganic oxide, preferably alumina, silica, titania, zirconia or mixtures thereof. The most preferred carrier material is titania. The carrier could be added onto the porous bodies prior to addition of the catalytically active metal, for example by impregnation. Additionally or alternatively, the catalytically active metal and carrier material could be admixed and then added to the porous bodies. For example, a powder form of the catalyst material could be formed into a slurry, and then spray coated onto the porous bodies.

A suitable catalyst comprises cobalt as the catalytically active metal and zirconium as a promoter. Another suitable catalyst comprises cobalt as the catalytically active metal and manganese and/or vanadium as a promoter.

In one embodiment, the reactor of the present invention comprises porous bodies of which more than 95 weight % (wt %), more preferably more than 99 wt %, most preferably more than 99.9 wt %, has a size in the range of between 1 mm to 50 mm, preferably 1 mm to 30 mm, calculated on the total weight of the porous bodies in the reactor.

Catalyst bodies comprising porous bodies with a minimum size of 1 mm and a maximum size of up to 50 mm may be fixed within a reactor tube. Alternatively, they may be movable within a reactor tube so as to seek the most even catalytic transfer and heat transfer, but without being fixed within the reactor tube. With catalyst retainers it can be ensured that movable catalyst bodies stay within the reactor tube.

In one embodiment, the reactor of the present invention comprises large catalyst bodies, i.e. larger than 50 mm, for example up to 500 mm, even up to 2 m. Preferably the reactor of the present invention comprises porous bodies of which more than 95 weight % (wt %), more preferably more than 99 wt %, most preferably more than 99.9 wt %, has a size in the range of between 50 mm to 2 m, preferably 50 cm to 1 m, calculated on the total weight of the porous bodies in the reactor. Catalyst bodies of more than 50 mm may be immobilized within a reactor tube.

In a preferred embodiment, a reactor tube in a reactor according to the present invention comprises a catalyst retainer in the top and/or in the bottom of the reactor tube. Most preferably the reactor tubes in the reactor comprise both a catalyst retainer in the top and a catalyst retainer in the bottom. A catalyst retainer allows gas and liquid to pass through, but which does not allow catalyst bodies to go through. An example of a suitable catalyst retainer is a catalyst retainer made of gauze with a sufficient mesh size. A catalyst retainer may be placed at an opening of a catalyst tube, and is preferably placed at the inside of a catalyst tube.

In one embodiment, a reactor tube in a reactor according to the present invention may be filled with porous catalyst bodies in a stacked way. In one embodiment, a reactor tube in a reactor according to the present invention may be filled with porous catalyst bodies to form a gradient.

Over the length of a reactor tube several properties may be varied. For example, the internal voidage of the catalyst bodies at the top of a reactor tube may be lower than at the bottom. For example, the external voidage of the catalyst bodies at the top of a reactor tube may be smaller than at the bottom. For example, the amount of catalyst material on the porous bodies may be larger at the top of the reactor tube than at the bottom. The amount of catalytically active material in the catalyst material on the porous bodies may be lager at the top of the reactor tube than at the bottom. The catalyst bodies at the top of the reactor tube may comprise a different catalytically active metal than the catalyst bodies at the bottom. The catalyst bodies at the top of the reactor tube may have a different shape as compared to the catalyst bodies at the bottom of the tube.

In one embodiment, reactor tubes may be filled with catalyst bodies in a stacked way, for example by loading two to four layers on top of each other, whereby each layer has a different catalytic activity. In such a case each layer placed on top of another layer may have a higher intrinsic catalytic activity than the layer underneath. In a reactor according to the invention, the reactor thus may comprise one or more reactor tubes in which one or more layers of catalyst bodies in the top of the reactor tube has/have a higher intrinsic activity than one or more layers of catalyst bodies in the bottom of the reactor tube.

The invention extends to the use of a reactor according to the present invention as a Fischer Tropsch reactor.

The invention further extends to a process for performing a Fischer Tropsch reaction comprising the steps:
providing syngas to a reactor according to the invention
removing Fischer Tropsch product from the reactor.

The Fischer-Tropsch reaction is preferably carried out at a temperature in the range from 125 to 400° C., more preferably 175 to 300° C., most preferably 200 to 260° C. The pressure preferably ranges from 5 to 150 bar, more preferably from 20 to 80 bar. The gaseous hourly space velocity may vary within wide ranges and is typically in the range from 500 to 10000 Nl/l/h, preferably in the range from 1500 to 4000 Nl/l/h. The hydrogen to CO ratio of the feed as it is fed to the catalyst bed generally is in the range of 0.5:1 to 2:1.

Products of the Fischer-Tropsch synthesis may range from methane to heavy hydrocarbons. Preferably, the production of methane is minimized and a substantial portion of the hydrocarbons produced have a carbon chain length of a least 5 carbon atoms. Preferably, the amount of C5+hydrocarbons is at least 60% by weight of the total product, more preferably, at least 70% by weight, even more preferably, at least 80% by weight, most preferably at least 85 % by weight. The CO conversion of the overall process is preferably at least 50%.

The shape, size and configuration of the reactor tubes and their arrangement within a reactor are governed primarily by factors such as the capacity, operating conditions and cooling requirements of the reactor. The reactor tubes may have any cross-section which provides for efficient packing of the catalyst within a reactor, for example, the reactor tubes may be of circular, square, triangular, rectangular, trapezoidal (especially covering three equilateral triangles) or hexagonal cross-section. A reactor tube having a circular cross-section is advantageous in terms of ease of manufacture, mechanical stability, and in providing uniform heat transfer.

The invention will now be explained in more detail with reference to the drawing, which shows an example of a reactor according to the invention.

FIG. 1 is a vertical cross-section of a reactor according to the present invention; the catalyst in the reactor tubes is not shown.

FIG. 1 shows a reactor 1 for carrying out an exothermic process, such as a Fischer-Tropsch process, comprising a reactor shell 2, a reactant inlet 3, a product outlet 4, a top outlet 5, a coolant chamber 6 comprising an inlet 7 and outlet 8 for a coolant, and reactor tubes 9. The reactor 1 further comprises a gas distribution system 11 below the coolant chamber 6. The space below the coolant chamber 6 is indicated in FIG. 1 with number 15.

Parallel plates 16 and 17 separate the coolant chamber 6 from the space 15 below the coolant chamber 6 and the space 13 above the coolant chamber 6.

During operation, syngas is fed through the inlet 3 to the gas distribution system 11 and into reactor tubes 9 which comprise the catalyst. As indicated in FIG. 1, the gas distribution system 11 passes gas into the reactor tubes 9 via distribution system outlets that are, in this case, placed inside each reactor tube.

The gaseous reactants pass through the reactor tubes 9, as indicated in FIG. 1 with arrow 10.

Liquid recycle will take place via liquid recycle tube 18. As indicated with the arrow in liquid recycle tube 18, liquid will flow down tube 18.

The upper part of the reactor 1 comprises a dome 12 having an inner diameter equal to that of the main cylindrical section of the reactor 1. The space above the coolant chamber is indicated in FIG. 1 with number 13. In the space 13 above the coolant chamber 6 the product may rise to a certain level. In FIG. 1 the liquid level 14 of the product is indicated. Offgas may pass through the space 13 above the coolant chamber 6 to the top outlet 5. Liquid product is discharged via outlet 4 below the coolant chamber 6 on the basis of level control (not shown) above the coolant chamber 6.

During operation, coolant, typically water and/or steam, is fed through the inlet 7 to the coolant chamber 6. There, the coolant is heated and discharged via the outlet 8. Heat is transferred from the catalyst in the reactor tubes 9 to the coolant in coolant chamber 6.

The invention is not limited to the embodiment described above, which can be varied in several ways within the scope of the claims. For instance, more than one coolant chamber may be used.

In a further example, the reactor according to the present invention can be used for other exothermic processes including hydrogenation, hydroformylation, alkanol synthesis, the preparation of aromatic urethanes using carbon monoxide, Kölbel-Engelhard synthesis, and polyolefin synthesis.

What is claimed is:

1. A process for performing a Fischer Tropsch reaction in a reactor comprising at least two reactor tubes, a coolant chamber, a space below the coolant chamber, a space above the coolant chamber and a gas distribution system in the space below the coolant chamber, whereby at least two reactor tubes extend through the coolant chamber such that the space below the cooling chamber is fluidly connected with the space above the cooling chamber and one or more highly porous catalysts, said catalyst(s) having a size of at least 1 mm and comprising a porous body and a catalyst material, whereby the porous body has a porosity within the range of between 50 and 98 volume %, said process comprising the following steps:

provided syngas to each of the reactor tubes individually at the bottom of each of the reactor tubes;

transporting liquid hydrocarbons from above the coolant chamber to below the coolant chamber and allowing liquid hydrocarbons to move from below the cooling chamber through at least one of the reactor tubes to above the cooling chamber; and removing Fischer Tropsch product from the reactor.

2. A process according to claim 1, wherein Fischer Tropsch product is removed from the reactor below the coolant chamber.

3. A process according to claim 1, wherein the Fischer-Tropsch reaction is preferably carried out at a temperature in the range from 125 to 400 °C.

4. A process according to claim 1, wherein the Fischer-Tropsch reaction is carried out at a pressure ranging from 5 to 150 bar.

5. A process according to claim 1, wherein the gaseous hourly space velocity may vary from 500 to 10000 Nl/l/h.

6. A process according to claim 1, wherein the Fischer-Tropsch reaction is performed in a reactor comprising a reactor shell, inlets for introducing reactants and coolant into the reactor shell, outlets for removing product and coolant from the reactor shell, at least two reactor tubes, a coolant chamber, and a gas distribution system below the coolant chamber having an outlet placed inside each reactor tube, whereby at least two reactor tubes extend through the coolant chamber to enable fluid communication between a space below the coolant chamber and a space above the coolant chamber, said reactor comprising one or more highly porous catalysts, said catalyst(s) having a size of at least 1 mm and comprising a porous body and a catalyst material, whereby the porous body has a porosity within the range of between 50 and 98 volume %.

7. A process according to claim 1, wherein the reactor comprises a hydrocarbon fluid which is present in an amount sufficiently large to have the one or more highly porous catalysts in the reactor tubes immersed in liquid.

8. A process according to claim 7, wherein the step of removing Fischer Tropsch product from the reactor is executed such that hydrocarbon fluid is removed as the product from the reactor in case the level of the hydrocarbon fluid in the reactor reaches a predetermined level in the reactor.

9. A process according to claim 1, wherein the provision of syngas to each of the reactor tubes individually is such that the syngas is provided directly into the reactor tube.

10. A process according to claim 1, wherein the one or more highly porous catalysts remain within the reactor tubes during the process.

* * * * *